United States Patent
Uemura et al.

[11] 3,876,488
[45] Apr. 8, 1975

[54] FEEDER FOR TIRE CORD AND THE LIKE TO THE DRUM OF A TIRE FORMING MACHINE

[75] Inventors: Tadashi Uemura; Masanori Hara, both of Nagayo-machi, Japan

[73] Assignee: Mitsubishi Jukogyo Kabushiki Kaisha, Tokyo, Japan

[22] Filed: July 20, 1973

[21] Appl. No.: 381,093

[30] Foreign Application Priority Data
Aug. 24, 1972 Japan.......................... 47-98096[U]

[52] U.S. Cl. ................ 156/405; 156/123; 226/158; 226/167; 226/124
[51] Int. Cl. ............................................ B29h 17/20
[58] Field of Search.................... 156/123, 405, 406; 226/124, 156, 158, 167

[56] References Cited
UNITED STATES PATENTS
1,419,064  6/1922  Landon .............................. 156/405
1,555,196  9/1925  Freeman .......................... 156/405 X
2,035,422  3/1936  Breth et al. ...................... 156/405 X
2,702,070  2/1955  Lindemann ...................... 156/405 X
3,071,179  1/1963  Tourtelotle et al. ................ 156/405
3,595,724  7/1971  Lebloud .............................. 156/405

Primary Examiner—Clifton B. Cosby
Attorney, Agent, or Firm—Cushman, Darby & Cushman

[57] ABSTRACT

An improvement of a feeder for tire cord, steel breaker, etc. to the drum of a tire forming machine, comprising in combination an underframe, a guide roller, a roller provided with a pinion, a pressing roller, releasing metallic implement for the pressing roller, a rack, a guide roller and a driving source.

This improved feeder assures a smooth feeding of a blank to the drum of the tire forming machine and a safe treating of the section end of the blank.

1 Claim, 4 Drawing Figures

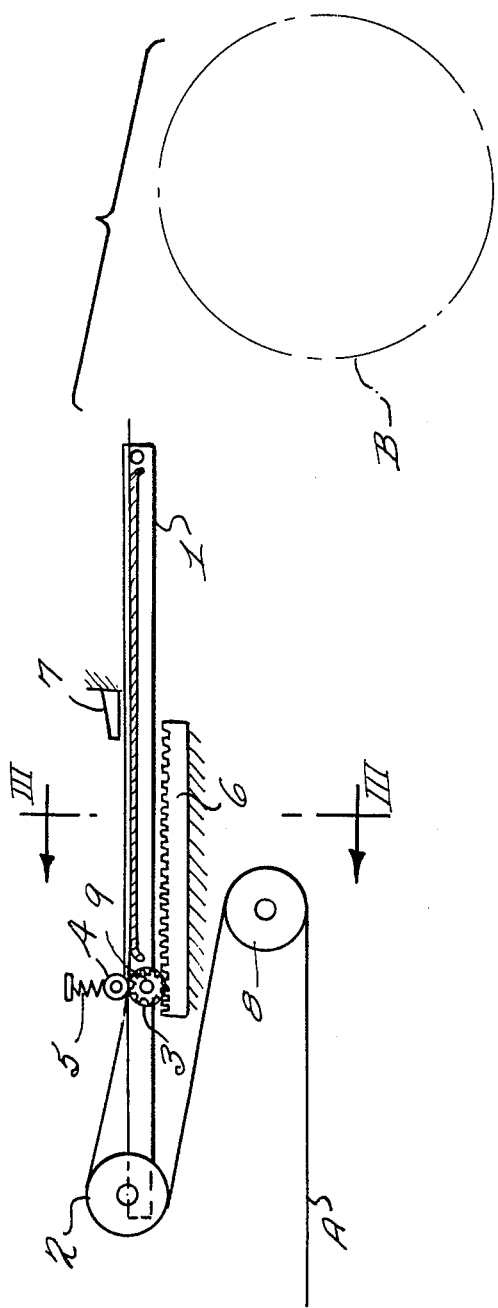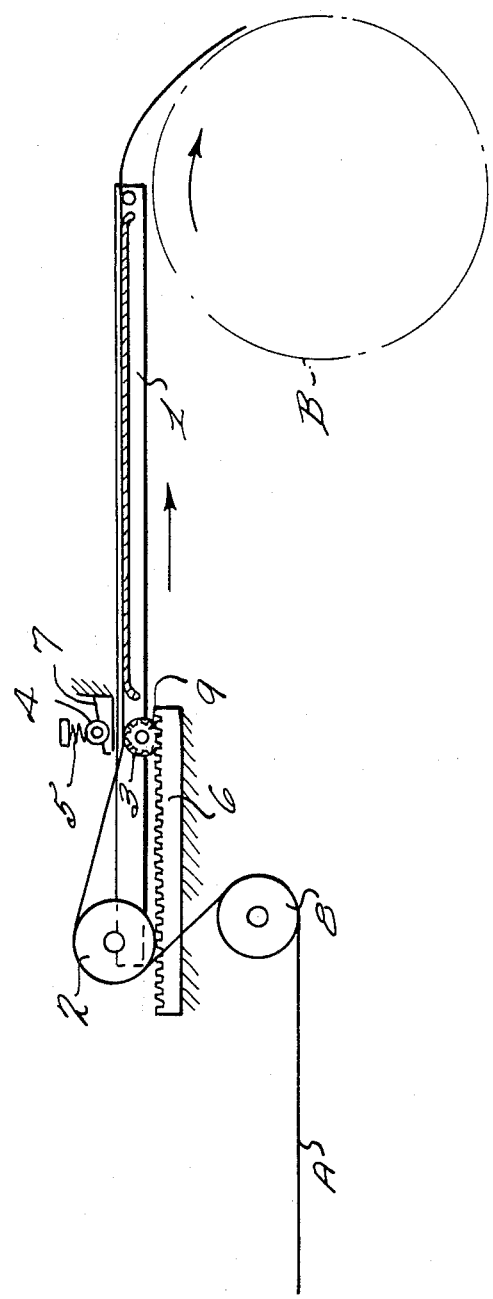

FEEDER FOR TIRE CORD AND THE LIKE TO THE DRUM OF A TIRE FORMING MACHINE

BACKGROUND OF THE DISCLOSURE

Usually, tire cord and the like are fed to the drum of a tire forming machine by means of a servicer arranged in front of the machine, however, said servicer is made up to be adapted for conventional tire (bias tire).

While, in recent years, as the radializing of tire progresses, the tire cord becomes to be used from textile cord to steel cord, steel breaker or the like, and in particular since the fiber angle decreased, the length $l$ of section end after cutting in the direction of fiber is considerably increased (in case of steel breaker, $l$ is about 1 m). as shown in FIG. 4, so that in usual equipment it is inconvenient in the point that the treatment of said section is difficult, and particularly, since the steel breaker has larger rigidity as compared with the textile breaker, the treatment of the former is troublesome, and has a question that if the section end is treated with bare hands, it is attended with danger to injure the hands of worker.

SUMMARY OF THE INVENTION

This invention relates to an improvement of the feeder for tire cord and the like to the drum of a tire forming machine, particularly for steel cord and steel breaker. And the object of the invention is to provide such an equipment, in which the inconvenience and the question of said usual equipment are eliminated.

BRIEF DESCRIPTION OF THE DRAWINGS

The accompanying drawings show an embodiment of the present invention, wherein

FIG. 1 is a schematic side view of an underframe at a time limit of backward motion, FIG. 2 is a schematic side view thereof at a time limit of forward motion.

DESCRIPTION OF THE PREFERRED EMBODIMENTS

Figure 3:
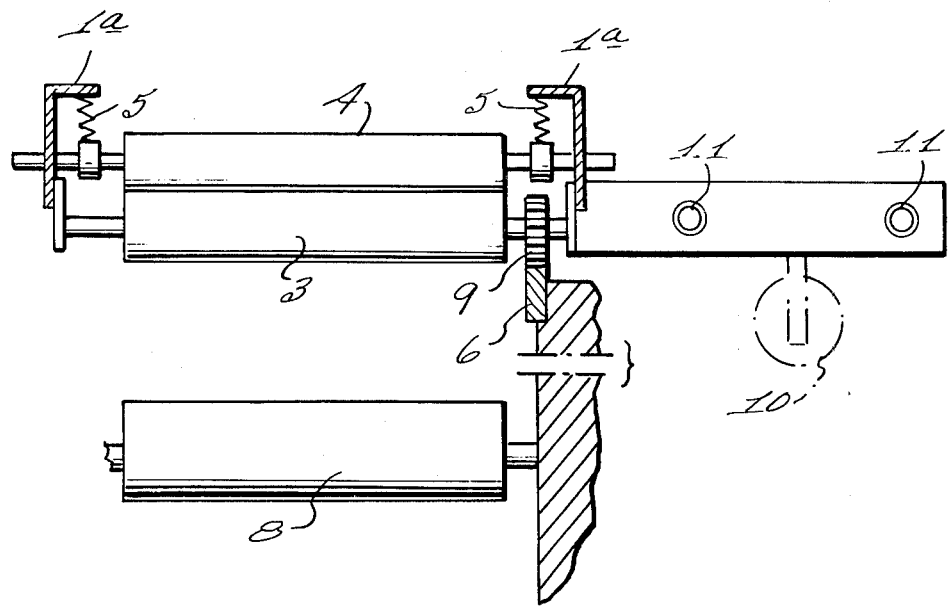
FIG. 3 is a sectional view taken along III — III line of FIG. 1

The present invention will be concretely explained with reference to the embodiment shown in the drawings, as follows.

In FIG. 1 to FIG. 3 inclusive, 1 denotes an underframe which is horizontally movable in forward and backward directions, 2 a guide roller rotatably supported by a shaft at a rear end of said underframe 1, 3 a roller provided with a pinion and rotatably supported by a shaft at an intermediate portion of said underframe 1, and 4 a pressing roller supported on said underframe 1 in parallel with said roller 3 and vertically movable, and said pressing roller 4 is always made to press on said roller 3 by means of a spring 5 interposed between a bracket 1a protruding from the underframe 1 and a shaft portion of said pressing roller 4. 6 denotes a rack fixed to a machine frame, which rack 6 is engaged with a pinion 9 provided on said roller 3. 7 denotes a releasing metallic implement for a wedge-shaped pressing roller fixed to a suitable position (not shown) adjacent to the upper surface of said underframe, and said releasing metallic implement 7 pushes up the shaft portion of the pushing roller 4 against the elasticity of the spring 5, when the underframe 1 is moved to a limited position of advance, thus to keep apart said pressing roller 4 from said roller 3. 8 denotes a guide roller, of which shaft is rotatably supported at a suitable position of the machine frame, and a steel cord or a steel breaker A from a source of supply of tire cord etc. (not shown) is spanned on said guide roller 8, then spanned on said guide roller 2, thus guided by these guide rollers to be inserted between the roller 3 and the pressing roller 4 on said underframe 1, and further to be supported on said underframe 1. 10 denotes a driving source for forward and backward motions of the underframe 1, and by means of said driving source 10, the underframe 1 is moved forward and backward to the extent of predetermined distance. And when the underframe is at its forward limited position, the front end of the underframe 1 locates just above the upper end face of the periphery of a drum B of the tire forming machine (in this case, the releasing metallic implement 7 pushes up the pressing roller 4, as described above). 11 denotes guide members for the underframe 1 fixed on the machine frame, by means of which guide members 11, the underframe 1 is guided at the time of forward and backward motions to prevent its right and left swings. And, the drum B is made to rotate in a predetermined direction by means of a driving source (not shown).

Figure 4:
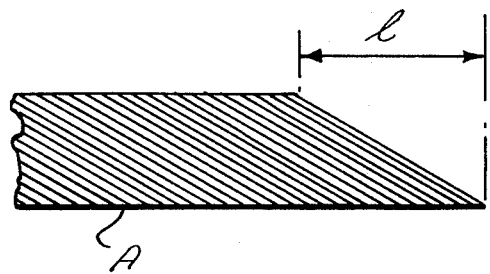
FIG. 4 is a longitudinal sectional view of a section end of a blank.

In the illustrated equipment, when a blank A, such as a steel cord or a steel breaker is fed to the drum B of the tire forming machine, at first the blank A is spanned on the guide rollers 8 and 2, as shown in the drawings, then its front end is inserted between the pressing roller 4 and the roller 3, and further the blank is put on and along the underframe 1 (in this case, the underframe 1 is located at the most retreated position). And, when the underframe 1 is moved forward by means of driving source 10, the front end of underframe 1 approaches to the upper end face of the periphery of the drum B to be in a state of FIG. 2. In the course of forward motion of this underframe, since the pinion 9 of the roller 3 engages with the rack 6, the roller 3 rotates in clockwise direction, as the underframe moves forward, to feed forwardly the blank A which is held between the rollers 3 and 4. Thereupon, when the front end of said blank A is fixed to the drum B, which is then rotated by its driving source in clockwise direction, the blank A is wound on to the drum B to be in a state shown in FIG. 2. In this state, the pressing roller 4 is pushed up by the releasing metallic implement 7, so that the blank A is put in a free state and is wound on to the drum B merely by the rotary driving power of the drum B. And, when the predetermined length of blank A is entirely wound on to the drum B, the blank A is obliquely cut off by the worker along the direction of fiber shown in FIG. 4. In this case, the cutt off end will protrude from the front end of the underframe 1 as a matter of course, however, the length of its protrusion is equal to the sum of a length $l$ of oblique section end and a length $\alpha$ (not shown) between the beginning end of cut off of the blank and the front end of underframe 1. And, as soon as the cut off of said blank A is finished, the underframe 1 is retreated to return to the original position, but, in its return course, the pressing roller 4 is parted from the releasing metallic implement 7 and pushed downward by the spring 5, so that the blank A is put between the pressing roller 4 and the roller 3, which is then rotated in anticlockwise direction by the rack 6 through the pinion 9 accompanying with its retreat. Therefore, the blank A is forcibly fed back to the rear by the rotation of roller 3 provided with a pinion. On the other hand, the guide roller 2 is also retreated together with the underframe 1, thus increasing the distance between rollers 2 and 8. Consequently, the blank A is retreated on and along the underframe 1 to the extent of a length approximately corresponding to the difference of the distances between the rollers 2 and 8 in the state of FIG. 2 and of FIG. 1. Therefore, if said difference of distances between said rollers is suitably set so that it is equal to the length $l + \alpha$, the portion of blank A protruded from the front end of the underframe 1 may be automatically contained within the upper face of the underframe 1 accompanied with its return to the original position.

Since the feeder according to the present invention is possessed of such construction and function as mentioned above, the blank A may be quite smoothly fed to the drum B of a tire forming machine as well as the protruded portion of the blank A from the front end of the underframe 1 upon cutting off the blank may be automatically received within the upper face of the underframe 1, even in case of using steel cord or steel breaker, it is possible to take practical effect that no measure is necessary for treating section end of the blank A and that no fear is needed for any worker to get hurt on the hands.

What is claimed is:

1. A feeder for tire cord and the like to the drum of a tire forming machine, characterized in that it comprises in combination an underframe, which is horizontally movable to the extent of a predetermined distance in forward and backward directions; a guide roller, which is rotatably supported on the rear end of said underframe; a roller provided with a pinion and rotatably supported at an intermediate portion of said underframe; a pressing roller, which is pressed by a spring onto said roller provided with pinion and supported vertically movable as well as rotatable on said underframe; a releasing metallic implement for the pressing roller, which implement is fixed to a machine frame adjacent to upper face of said underframe at a suitable position above both sides of said underframe; a rack, which is fixed to a suitable position of the machine frame and engaged with the pinion of said roller; a guide roller rotatably supported at a suitable position of the machine frame; and a driving source, which moves said underframe horizontally in forward and backward directions.

\* \* \* \* \*